(12) United States Patent
Al-Anzi

(10) Patent No.: US 9,193,616 B2
(45) Date of Patent: Nov. 24, 2015

(54) MOBILE BUOYANT AERATOR

(71) Applicant: Bader Shafaqa Al-Anzi, Abdulla Almubarak (KW)

(72) Inventor: Bader Shafaqa Al-Anzi, Abdulla Almubarak (KW)

( * ) Notice: Subject to any disclaimer, the term of this patent is extended or adjusted under 35 U.S.C. 154(b) by 382 days.

(21) Appl. No.: 13/655,165

(22) Filed: Oct. 18, 2012

(65) Prior Publication Data

US 2014/0110323 A1 Apr. 24, 2014

(51) Int. Cl.
*C02F 7/00* (2006.01)
*C02F 1/00* (2006.01)

(52) U.S. Cl.
CPC . *C02F 7/00* (2013.01); *C02F 1/001* (2013.01); *C02F 2201/008* (2013.01); *C02F 2303/24* (2013.01); *Y02W 10/15* (2013.01); *Y02W 10/37* (2013.01)

(58) Field of Classification Search
CPC .. B01F 3/04609; Y02W 10/15; Y02W 10/37; C02F 2201/008; C02F 1/001; C02F 7/00; C02F 2303/24
USPC ........................................ 261/145; 210/221.1
See application file for complete search history.

(56) References Cited

U.S. PATENT DOCUMENTS

| | | | | |
|---|---|---|---|---|
| 2,271,446 A | * | 1/1942 | Unger, Jr. | B01F 7/1655 210/205 |
| 2,695,710 A | | 11/1954 | Gibbs | |
| 3,147,217 A | | 9/1964 | Halton | |
| 3,416,729 A | * | 12/1968 | Ravitts | B01F 3/04773 239/16 |
| 3,496,901 A | * | 2/1970 | Neighbors et al. | 440/43 |
| 3,572,658 A | * | 3/1971 | Ravitts | B01F 3/04773 210/197 |
| 3,653,641 A | * | 4/1972 | Eron | 261/18.1 |
| 3,669,422 A | * | 6/1972 | Nogaj | B01F 3/04773 210/242.2 |
| 3,722,687 A | * | 3/1973 | Stebbins | B01D 17/0205 210/219 |
| 3,758,276 A | * | 9/1973 | Bond et al. | E04H 4/1681 15/1.7 |
| 3,802,673 A | * | 4/1974 | Ross | B01F 3/04773 114/264 |
| 3,843,520 A | * | 10/1974 | Bottorf | B01D 33/0006 210/161 |
| 3,936,381 A | * | 2/1976 | Pacaud | B01F 3/04773 210/195.1 |
| 4,268,398 A | * | 5/1981 | Shuck | B01F 3/04765 111/101 |
| 4,431,531 A | * | 2/1984 | Hollingsworth | B03D 1/24 209/170 |

(Continued)

FOREIGN PATENT DOCUMENTS

| | | | | |
|---|---|---|---|---|
| AU | WO 9109193 A1 | * | 6/1991 | ............ E04H 4/1263 |
| AU | WO 2007121509 A1 | * | 11/2007 | ................ C02F 3/04 |

OTHER PUBLICATIONS

Nielsen et al. "A comparison of sampling mechanisms available for small-diameter ground water monitoring wells" published in the spring of 1985.*

*Primary Examiner* — Amber R Orlando
*Assistant Examiner* — Stephen Hobson
(74) *Attorney, Agent, or Firm* — Richard C. Litman

(57) ABSTRACT

The mobile buoyant aerator has a buoyant toroidal capture tray for capturing contaminants and a large diameter tube extending downward through the center of the tray. The aerator may have air or other gas pumped down through a smaller concentric tube to exit at the bottom of the larger tube to entrain and carry contaminated water up the larger tube, capturing contaminants in the capture tray. Alternatively, the aerator may have a compressed gas tank at the bottom of the larger tube to preclude the need for a smaller diameter tube. In another alternative, the aerator has an air pump at the top of the structure to pump air down through the device. In a further alternative, the aerator has a water pump at the top of the structure that draws water from outside the aerator and pumps the water down through the center to entrain contaminated water.

20 Claims, 8 Drawing Sheets

(56) References Cited

U.S. PATENT DOCUMENTS

| | | | | |
|---|---|---|---|---|
| 4,485,013 A * | 11/1984 | Cockman | B01D 33/04 | 210/242.2 |
| 4,680,148 A * | 7/1987 | Arbisi | B01F 3/04099 | 210/242.2 |
| 4,681,711 A * | 7/1987 | Eaton | B01F 3/04602 | 210/242.2 |
| 4,690,756 A * | 9/1987 | Van Ry | A01K 61/007 | 210/170.06 |
| 4,707,308 A * | 11/1987 | Ryall | B01F 3/04517 | 210/221.2 |
| 4,734,235 A * | 3/1988 | Holyoak | B01F 3/04773 | 210/242.2 |
| 4,746,424 A * | 5/1988 | Drew | E04H 4/1263 | 134/167 R |
| 4,834,872 A * | 5/1989 | Overath | A01K 63/04 | 210/151 |
| 5,071,550 A * | 12/1991 | Bernhardt | | 210/242.2 |
| 5,133,854 A * | 7/1992 | Horvath | B01D 29/27 | 15/1.7 |
| 5,139,659 A * | 8/1992 | Scott | A01K 63/042 | 119/261 |
| 5,234,112 A * | 8/1993 | Valenzuela | B01F 5/0068 | 209/169 |
| 5,242,600 A | 9/1993 | Meylor et al. | | |
| 5,326,475 A * | 7/1994 | Kent | A01K 63/045 | 210/615 |
| 5,868,091 A * | 2/1999 | Gross | B63B 1/121 | 114/61.1 |
| 5,980,100 A * | 11/1999 | Haegeman | A01C 3/026 | 261/120 |
| 6,260,716 B1 | 7/2001 | Fontaine et al. | | |
| 6,311,632 B1 * | 11/2001 | Noel, Jr. | B63B 7/04 | 114/61.1 |
| 6,719,911 B2 | 4/2004 | Bourke | | |
| 7,022,223 B2 * | 4/2006 | Lovestead | B01D 19/0057 | 210/170.05 |
| 7,121,536 B2 * | 10/2006 | Ruzicka | B01F 3/04773 | 210/221.2 |
| 7,267,328 B2 * | 9/2007 | Witheridge | B01F 3/04517 | 261/121.1 |
| 7,427,221 B2 * | 9/2008 | Blumenthal | E02B 1/003 | 405/61 |
| 7,520,493 B1 * | 4/2009 | Haldane | B01F 3/0412 | 210/242.2 |
| 7,575,226 B2 * | 8/2009 | Reusche | B01F 3/0473 | 261/120 |
| 7,581,716 B2 * | 9/2009 | Tsai | B01F 3/0473 | 239/265.25 |
| 7,686,951 B2 * | 3/2010 | Wagner | E04H 4/1263 | 210/122 |
| 8,191,869 B2 * | 6/2012 | Galletta, Jr. | B01F 3/04765 | 261/120 |
| 8,413,966 B1 * | 4/2013 | Al-Anzi | B01F 13/0049 | 261/120 |
| 2006/0076283 A1 * | 4/2006 | Tsai | E04H 4/169 | 210/167.11 |
| 2006/0283805 A1 | 12/2006 | Schreppel, Jr. | | |
| 2008/0210643 A1 * | 9/2008 | Bradley | A01K 63/042 | 210/765 |
| 2010/0170450 A1 * | 7/2010 | Bradley | A01K 63/04 | 119/204 |
| 2012/0228216 A1 * | 9/2012 | Gavrieli | C02F 3/08 | 210/615 |
| 2013/0187297 A1 * | 7/2013 | Al-Anzi | B01F 3/04248 | 261/65 |

* cited by examiner

MOBILE BUOYANT AERATOR

BACKGROUND OF THE INVENTION

1. Field of the Invention

The present invention relates generally to water aeration devices, and particularly to a mobile buoyant aerator adapted to float freely in a body of water and to aerate at least the upper strata of the water.

2. Description of the Related Art

The contamination of various bodies of water by various means is an increasingly serious problem worldwide. Perhaps the most widespread contaminants are organic materials that enter the water system due to pollution from human habitation, either directly or indirectly, e.g., pollution from farms and the like. Such pollution can affect inland fresh water supplies (lakes and rivers), and can also be carried to the sea by inland rivers and waterways or by direct discharge of sewage and/or other pollutants into the sea. Organic material in the sewage of treatment plants is another example of such pollution, albeit contained for processing. The biochemical processes that occur in water due to such organic pollution are known to decrease the oxygen content of the water, thereby reducing or perhaps even destroying fish and other aquatic life in the contaminated body of water. Even if some fish remain in the polluted water, they are almost certainly unfit for human consumption, if caught.

It is generally considered that the most effective means of eliminating such pollutants in contaminated water is by bacteriological processing, wherein bacteria process the contaminants to break them down into harmless organic materials. However, such bacteria are aerobic, i.e., they require oxygen for their metabolism. This is well known in the sewage treatment field, where water is commonly treated by aeration after solids are removed by settling or other means. Such aeration is generally accomplished by pneumatic means, e.g., pumping the water up for dispensing into the air from spray booms and nozzles, or by forcing air through underwater pipes for the air to bubble up through the water. Such pneumatic systems are relatively costly to operate and require relatively high energy and manpower costs. Even if such systems were less costly to operate, a huge drawback is that they cannot be readily transported to a pollution site for operation at that site. Rather, the water must be transported to the location of the aeration system, a process that is clearly unworkable on a very large scale and/or over very long distances.

Another principle of aerator operation uses mechanical motion to drive a propeller or the like to disturb the surface of the water and entrain air into the water. The pneumatic system described above and such mechanical systems are by far the most common water aeration systems in use, and neither is particularly efficient or economical due to the relatively high labor required for their deployment, operation, and maintenance.

Thus, a mobile buoyant aerator solving the aforementioned problems is desired.

SUMMARY OF THE INVENTION

The mobile buoyant aerator is an aerator provided with flotation and independent motion. The aerator has a toroidal contaminant capture tray and a tube extending downward therethrough. Various embodiments may incorporate a source of compressed air or other gas or a motorized pump to deliver the air or gas. Each of the embodiments is equipped with some form of propulsion to provide at least limited mobility. Navigation may be provided by conventional means, e.g., remote control, global positioning system and autonomous control, etc.

In a first embodiment, the aerator has two concentric central tubes and a tank of compressed air or other gas installed atop the smaller diameter central tube. Air is released from the compressed air tank to travel down the smaller diameter tube, where it enters the lower portion of the larger diameter surrounding tube and bubbles up through the tube, entraining contaminants as it does so. The contaminated and aerated water then flows into the toroidal capture tray, where the contaminants are captured. A filter may be provided across the top of the capture tray. The water flows through a drain in the bottom of the tray for further treatment or return to the ambient supply, as appropriate. A second embodiment is similar to the first embodiment, but the compressed gas tank is placed at the bottom of the return tube, where the gas is released directly into the return tube. This embodiment does not require the smaller diameter down tube in the center of the larger tube.

A third embodiment incorporates a water pump at the top of the device. The pump draws water from a supply tube extending beyond the toroidal capture tray and pumps the water down through a smaller diameter central tube to entrain contaminated water as it travels up through the larger diameter tube. A fourth embodiment comprises an air pump disposed at the top of the device, pumping air down through the smaller diameter central tube to entrain water and bubble back up through the larger diameter surrounding tube. Any of the embodiments may incorporate a skimming device at the top of the larger diameter tube, i.e., in the center of the toroidal tray, to skim off contaminants as they rise to the top of the tube if the force of the upward rising water and entrained air and contaminants is not sufficient to force the contaminants from the top of the tube and into the capture tray and its filter, if so equipped.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The mobile buoyant aerator is a free floating device for deployment in a body of water for removal of contaminants therefrom and/or for aerating the water to facilitate the breakdown of organic contaminants therein. The mobile buoyant aerator uses compressed air or other gas delivered from above or below the unit, or air or water pumped through the unit by an onboard pump.

Figure 1:
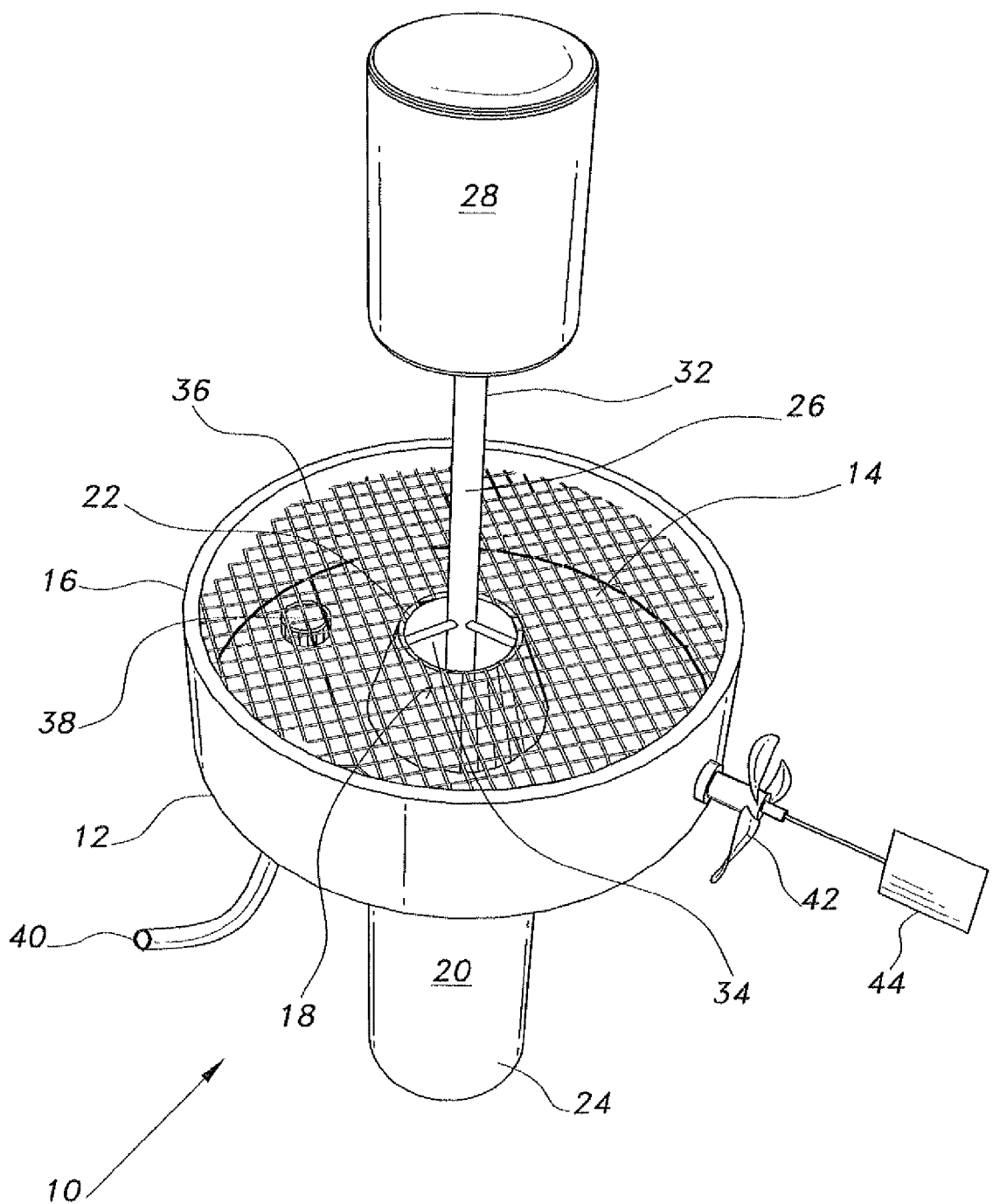
FIG. 1 is a perspective view of a first embodiment of a mobile buoyant aerator according to the present invention, illustrating various features thereof.
Figure 2:
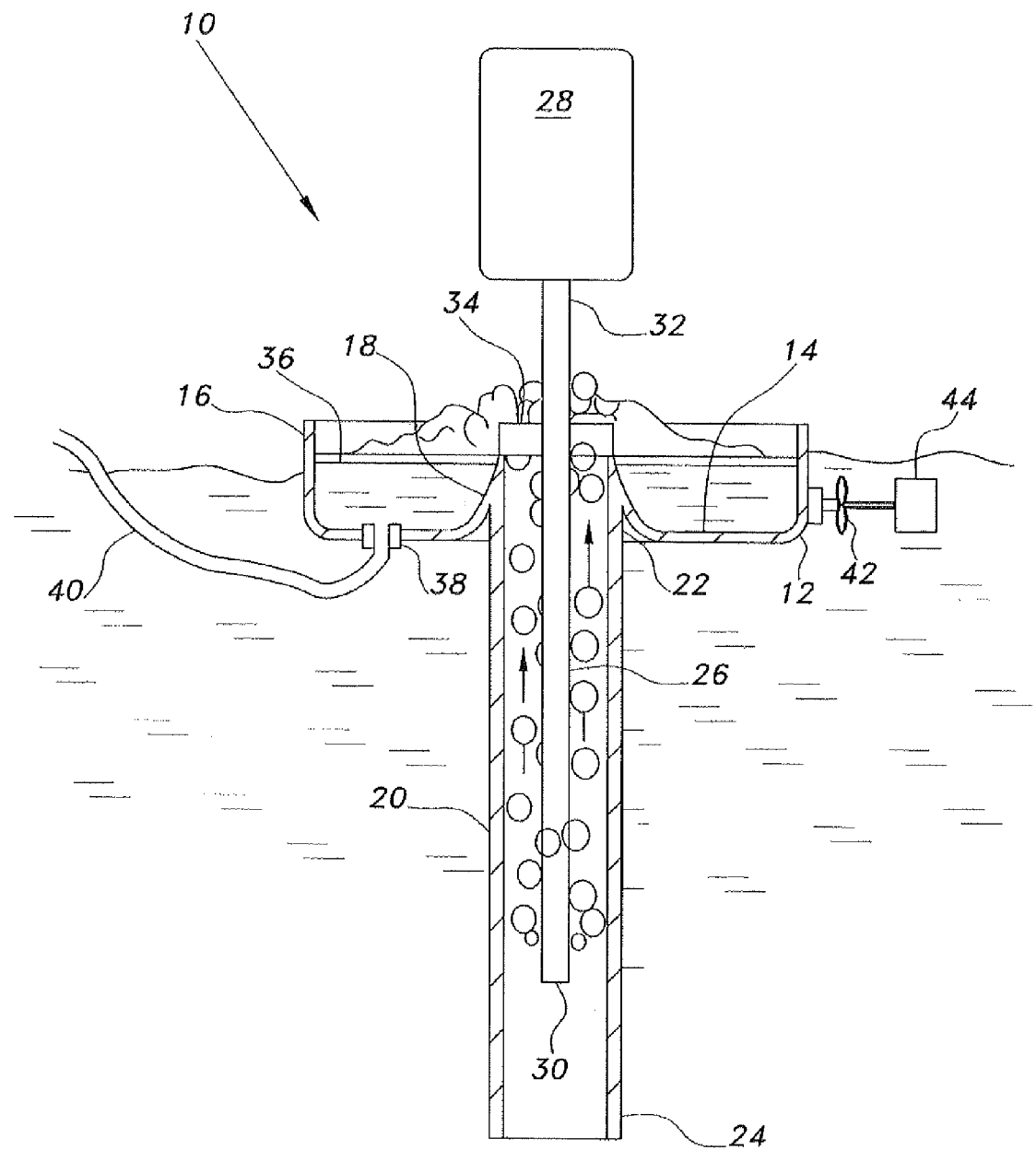
FIG. 2 is a side view of the mobile buoyant aerator of FIG. 1, shown partially in section to illustrate further features thereof.

FIGS. 1 and 2 of the drawings illustrate a first embodiment of the mobile buoyant aerator 10 incorporating a top mounted tank of compressed air or other gas to provide aeration. The aerator 10 includes a buoyant contaminant capture tray 12 having a toroidal configuration including a floor 14, a circular or low cylindrical outer wall 16, and a smaller diameter cylindrical inner wall 18 concentric with the outer wall 16. The structure of the capture tray 12 is of sufficient thickness to provide flotation volume for the entire aerator 10. A relatively large diameter hollow fluid entrainment tube 20 extends downward from the center of the capture tray 12. The inner wall 18 of the tray 12 surrounds the open upper end 22 of the tube 20. The opposite lower end 24 of the tube 20 is also open, so that water freely flows into the hollow interior of the tube 20 from the lower end 24 thereof when the aerator 10 is deployed in the water.

A fluid delivery device comprising a gas delivery tube 26 and container of compressed air 28 is installed with the aerator 10. The gas delivery tube 26 is installed concentrically through the fluid entrainment tube 20. The lower end 30 (shown in FIG. 2) of the tube 26 terminates within the lower portion of the entrainment tube 20, and the opposite upper end 32 of the delivery tube 26 extends above the upper end 22 of the entrainment tube 20 and the structure of the capture tray 12. The gas delivery tube 26 is supported within the entrainment tube 20 by conventional means (not shown, for clarity in the drawing), e.g., radial struts between the delivery tube 26 and the inner wall of the entrainment tube 20, etc. The tank or container 28 of compressed air or other gas is installed upon the upper end 32 of the gas delivery tube 26. The container 28 selectively delivers gas to the delivery tube 26 by conventional valves, regulators, etc. (not shown).

The mobile buoyant aerator 10 is placed at the desired location in the water, and the container or tank 28 of compressed air or gas is opened to the upper end 32 of the gas delivery tube 26 to allow the air or gas to flow downward through the tube 26. The compressed air or gas flows outward from the lower end 30 of the gas delivery tube 26. The lighter gas bubbles upward within the hollow fluid entrainment tube 20 and entrains water therewith. The mixture of gas and entrained water bubbles from the open upper end 22 of the entrainment tube 20, whereupon it flows outward into the contaminant capture tray 12.

In certain situations, there may be minimal upward force for the water and gas mixture as it travels through the entrainment tube 20. Foreign matter and/or contaminants may tend to collect at the upper end of the entrainment tube, rather than flowing outward therefrom and into the capture tray 12. Accordingly, a rotary skimmer 34 may be installed at the upper end 22 of the entrainment tube 20 to skim any foreign matter and/or contaminants from the upwelling water and gas mix as it reaches the upper end of the entrainment tube 20. The skimmer 34 may be rotated by the force of the upwelling water and gas as it reaches the upper end 22 of the entrainment tube 20, or by other conventional means. The skimmer 34 is not shown in other embodiments of the mobile buoyant aerator, but it will be noted that it may be installed with other embodiments.

The water and gas mixture, along with any contaminants contained therewith, flows outward from the upper end 22 of the entrainment tube 20 and into the contaminant capture tray 12. A screen or filter 36 may be installed across the top of the tray 12 between the outer wall 16 and the upper end 22 of the entrainment tube 12, i.e., the upper edge of the inner wall 18 of the tray 12. (The screen or filter 36 is illustrated as having a relatively coarse mesh in FIG. 1 in order to show more clearly the underlying structures, but it will be seen that the screen or filter 36 may be of sufficiently fine gauge that it captures fine organic contaminants, oil, etc.) The water that flows through the screen or filter 36 drains from the interior of the capture tray 12 through a drain passage 38 in the floor 14 of the tray, and thence outward through a drain hose or line 40 for additional processing, cleaning, etc. Solids having a specific gravity greater than that of water are unable to sink through the screen or filter 36, and are captured by the screen or filter 36 for later disposal. As in the case of the skimmer 34, the screen or filter 36 is not illustrated in the drawings of the other embodiments of the mobile buoyant aerator, but it will be noted that it may also be included with any of the other embodiments.

All of the embodiments of the mobile buoyant aerator are configured as free floating, independent units that may be operated free of any anchoring or restraint devices. Accordingly, they may include a propulsion and guidance system for positioning. The mobile buoyant aerator 10 of FIGS. 1 and 2 includes a motorized propeller 42 and rudder 44 extending from the outer wall 16 of the capture tray 12 for propulsion and guidance. The propeller 42 may receive power from a conventional source (electrical storage cells, etc.), or may even be powered by a pneumatic motor that receives its power from the compressed air or gas tank 28 of the device. The rudder 44 may be actuated conventionally by a suitable electrical power source. The propulsion and guidance of the mobile buoyant aerator 10 may be autonomous, having coordinates entered into a guidance system and operating the propeller 42 and rudder 44 in accordance with suitable position determination means (loran, global positioning system, etc.). Alternatively, the propulsion and guidance system may be operated remotely by a human operator using an appropriate transmitter and receiver.

Figure 3:
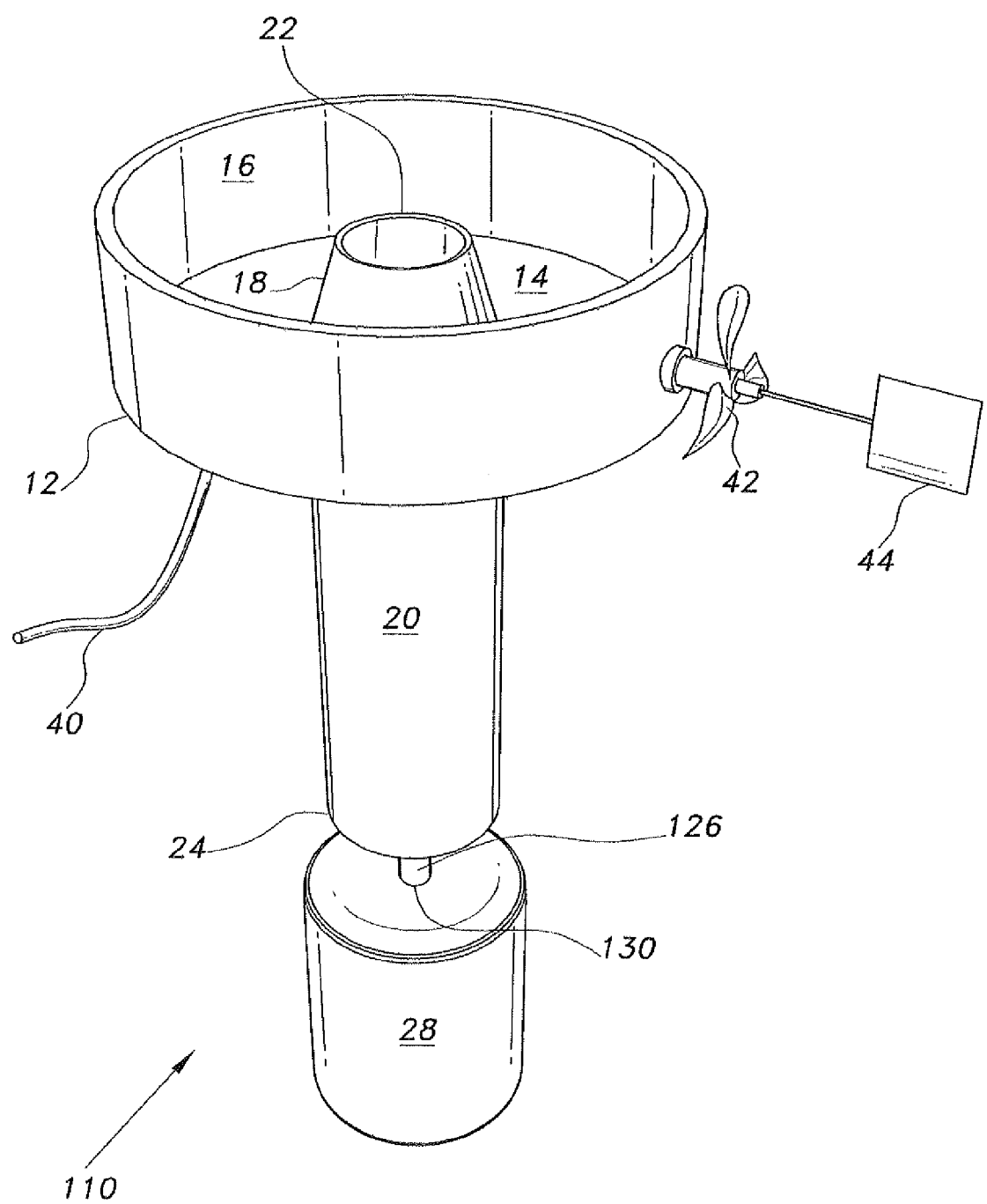
FIG. 3 is a perspective view of a second embodiment of a mobile buoyant aerator according to the present invention, illustrating various features thereof.
Figure 4:
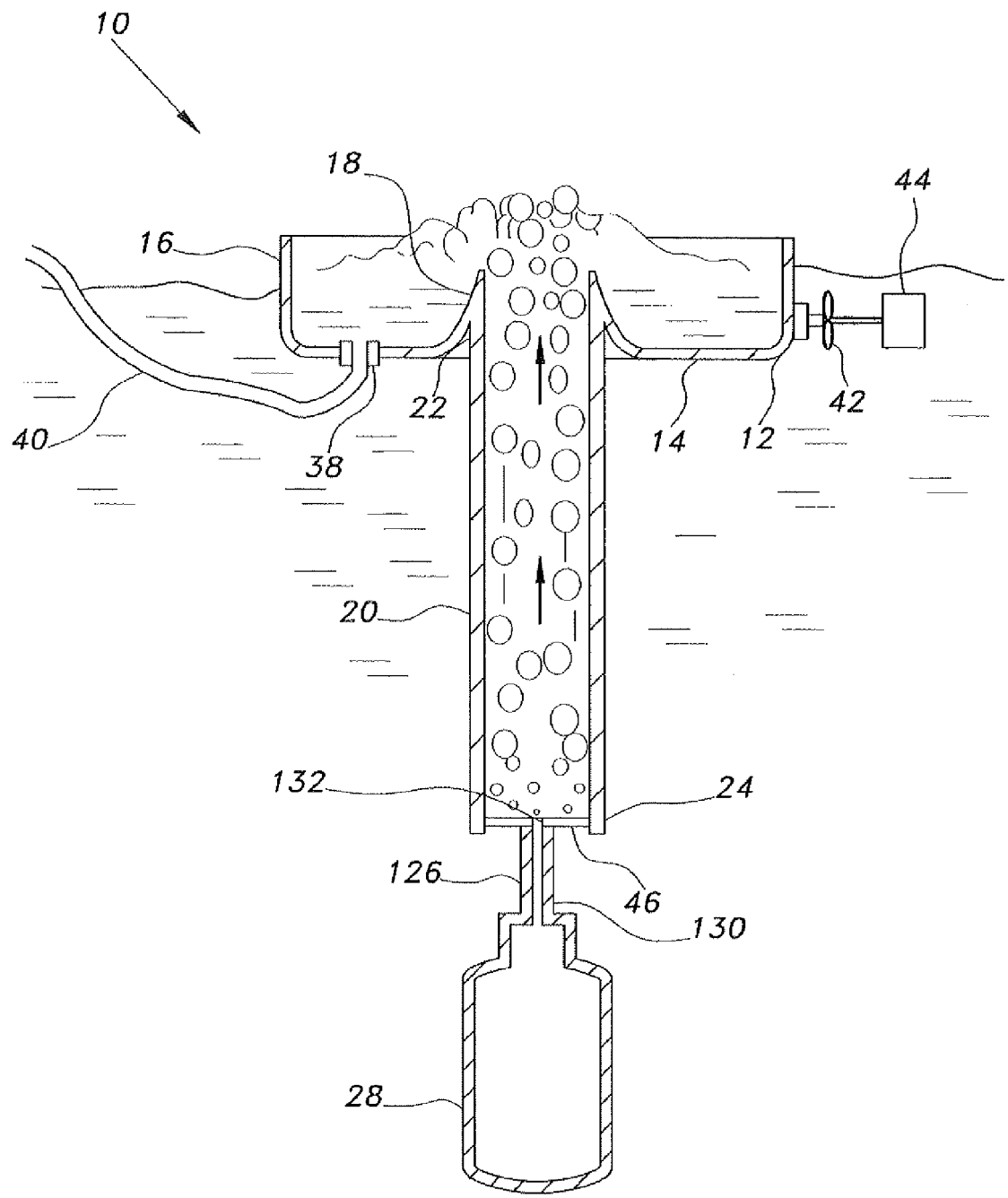
FIG. 4 is a side view of the mobile buoyant aerator embodiment of FIG. 3, shown partially in section to illustrate further features thereof.

FIGS. 3 and 4 illustrate a second embodiment of a mobile buoyant aerator 110, in which the compressed gas or air tank is positioned at the bottom of the fluid entrainment tube. Most of the components of the mobile buoyant aerator 110 of FIGS. 3 and 4 are identical to those corresponding components of the aerator 10 of FIGS. 1 and 2, i.e., the contaminant capture tray 12, its floor 14 and walls 16 and 18, the fluid entrainment tube 20 having upper and lower ends 22 and 24, the capture tray drain 38 (shown in FIG. 4) having a drain hose or line 40, and the motorized propeller 42 and rudder 44. The skimmer and filter screen are not shown in the aerator 110 of FIGS. 3 and 4, although they may be added, if desired, as noted further above.

The mobile buoyant aerator 110 embodiment of FIGS. 3 and 4 differs from the embodiment of FIGS. 1 and 2 in that its tank or container 28 of compressed air or gas is installed at the bottom of the assembly, rather than from above the remainder of the assembly. A relatively short gas delivery tube 126 is concentric with the larger diameter fluid entrainment tube 20. The upper end 132 of the delivery tube 126 is connected to the lower end 24 of the entrainment tube 20 by suitable struts 46 or the like to keep the lower end 24 of the entrainment tube 20 open. The compressed air or gas tank or container 28 is attached to the lower end 130 of the gas delivery tube 126 to extend beneath the remainder of the structure of the aerator 110.

Operation of the mobile buoyant aerator 110 is substantially as described above for the aerator 10 of FIGS. 1 and 2. The compressed gas or air is released from the tank or container 28 to flow through the gas delivery tube 126 to the lower end 24 of the fluid entrainment tube 20. The air or gas bubbling upward through the entrainment tube 20 entrains water therewith. The air and water mix (and any contaminants entrained therewith) bubbles out from the upper end 22 of the entrainment tube 20, to be captured in the tray 12. Suitable filtration or screening means, not shown in the aerator 110 of FIGS. 3 and 4, may be incorporated into the aerator 110, if desired, substantially as shown and described further above for FIGS. 1 and 2.

Figure 5:
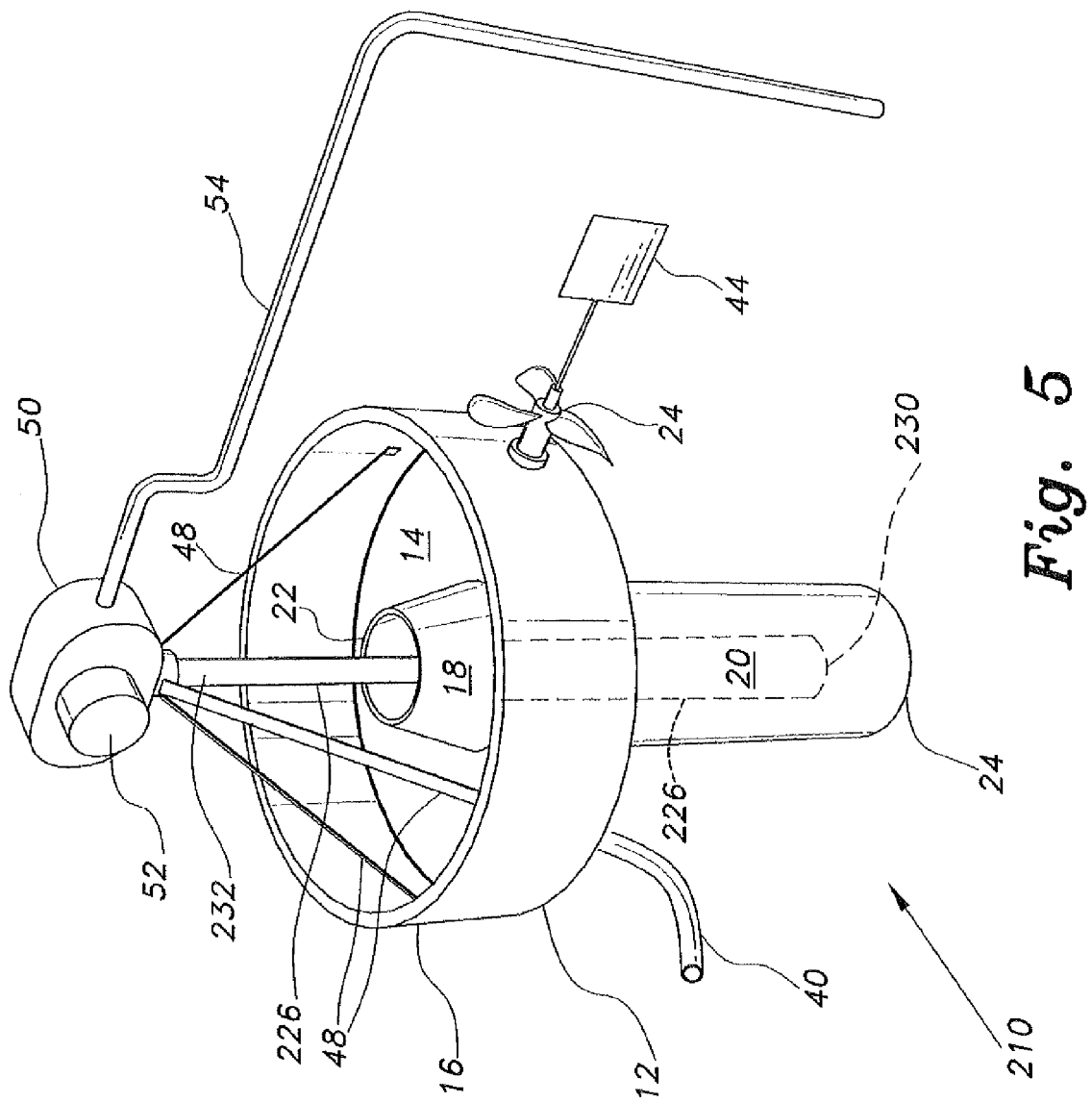
FIG. 5 is a perspective view of a third embodiment of a mobile buoyant aerator according to the present invention, illustrating various features thereof.
Figure 6:
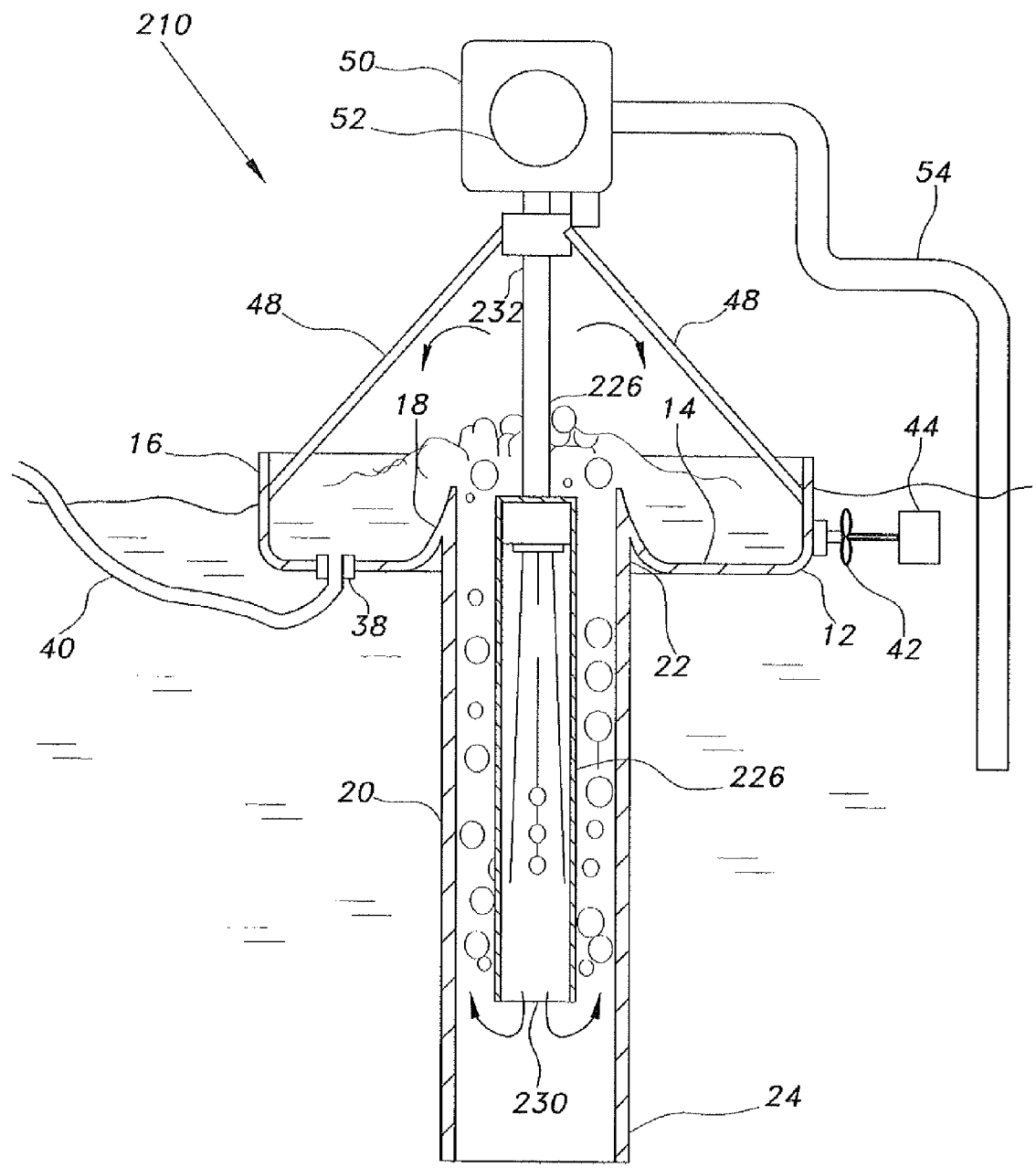
FIG. 6 is a side view of the mobile buoyant aerator of FIG. 5, shown partially in section to illustrate further features thereof.

FIGS. 5 and 6 of the drawings illustrate another embodiment of the mobile buoyant aerator 210, wherein the working fluid is water rather than air or other gas. Most of the components of the mobile buoyant aerator 210 of FIGS. 5 and 6 are identical to those corresponding components of the aerator 10 and 110 of FIGS. 1 through 4, i.e., the contaminant capture tray 12, its floor 14 and walls 16 and 18, the fluid entrainment tube 20 having upper and lower ends 22 and 24, the capture tray drain 38 (shown in FIG. 6) and drain hose or line 40, and the motorized propeller 42 and rudder 44. The skimmer and filter screen are not shown in the aerator 210 of FIGS. 5 and 6, although they may be added, if desired, as noted further above.

However, rather than using a source of compressed air or gas as the working fluid, the mobile buoyant aerator 210 of FIGS. 5 and 6 uses water drawn from the body of water in which the aerator 210 is deployed. Rather than having a gas delivery tube, the aerator 210 of FIGS. 5 and 6 has a water delivery tube 226 installed concentrically within the fluid entrainment tube 20. The lower end 230 of the water delivery tube 226 is disposed within the lower portion of the fluid entrainment tube 20, but above its lowermost end 24. The water delivery tube 226 may have a lower portion of larger diameter than the upper portion, as shown in FIGS. 5 and 6. The upper end 232 of the water delivery tube 226 is secured above the capture tray 12 by appropriate struts or stays 48. The lower portion and/or lower end 230 are secured within the outer fluid entrainment tube 20 by suitable means (not shown). A water pump 50 is installed atop the upper end 232 of the water delivery tube 226, the pump 50 being driven by a suitable motor 52.

Operation of the mobile buoyant aerator 210 is similar to the operation of the aerators 10 and 110 of FIGS. 1 through 4 described further above, with the exception of using water as the working fluid rather than air or other gas. The pump 50 draws water from beneath the surface of the body of water in which the mobile buoyant aerator 210 is deployed by a water intake tube or pipe 54. The water is pumped down through the water delivery tube 226, and exits the lower end 230 of the tube within the lower portion of the outer fluid entrainment tube 20. Any water mixed with lighter contaminants (e.g., oil, etc.) will have an average density less than that of the relatively clean water being pumped through the system, and will tend to rise through the fluid entrainment tube 20 to exit the upper end 22 of the tube 20 and be captured within the contaminant capture tray 12. As in the case of the first two embodiments of FIGS. 1 through 4, suitable filtration or screening means, not shown for the aerator 210 of FIGS. 5 and 6, may be incorporated into the aerator 210, if desired.

Figure 7:
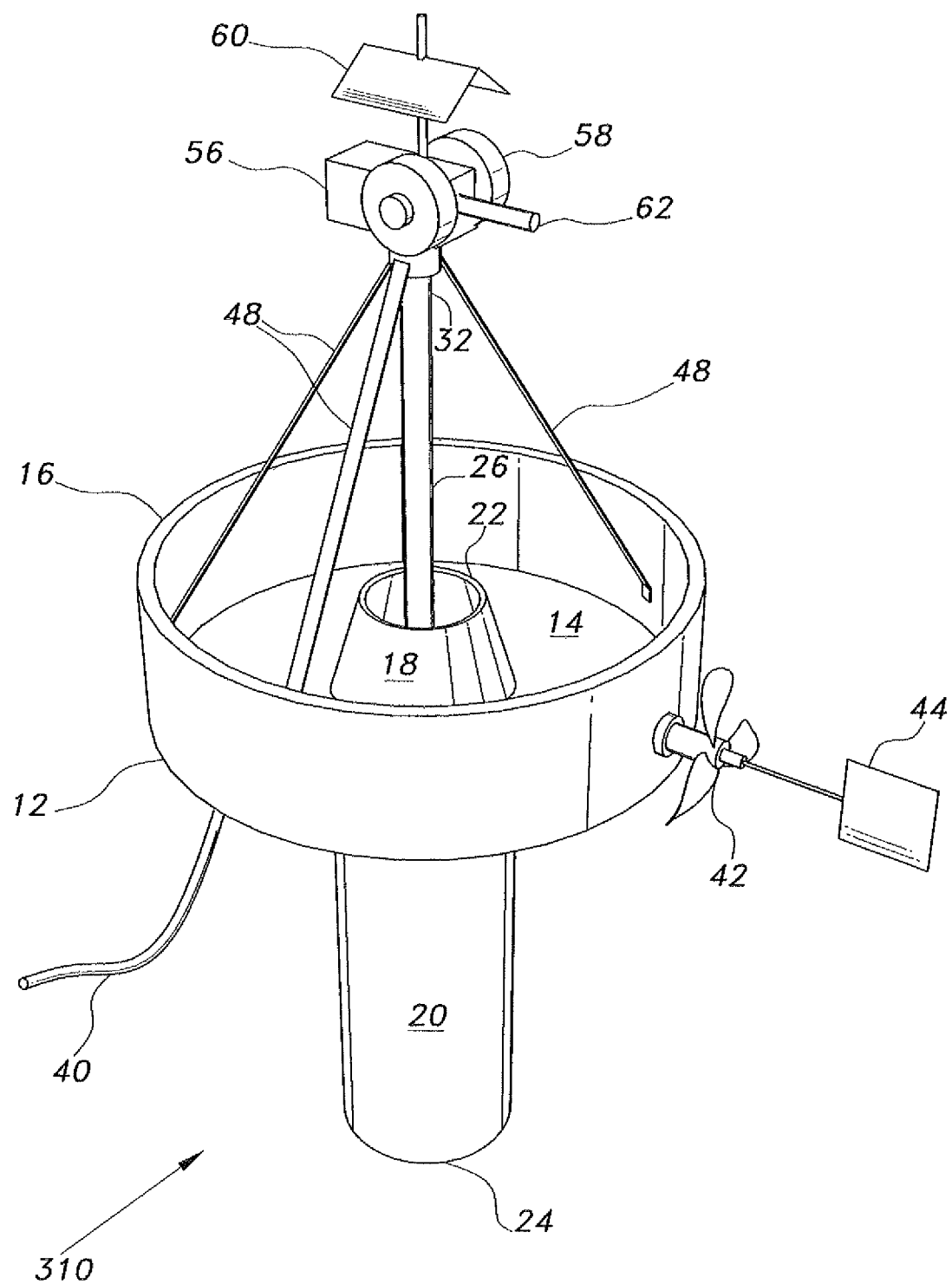
FIG. 7 is a perspective view of a fourth embodiment of a mobile buoyant aerator according to the present invention, illustrating various features thereof.
Figure 8:
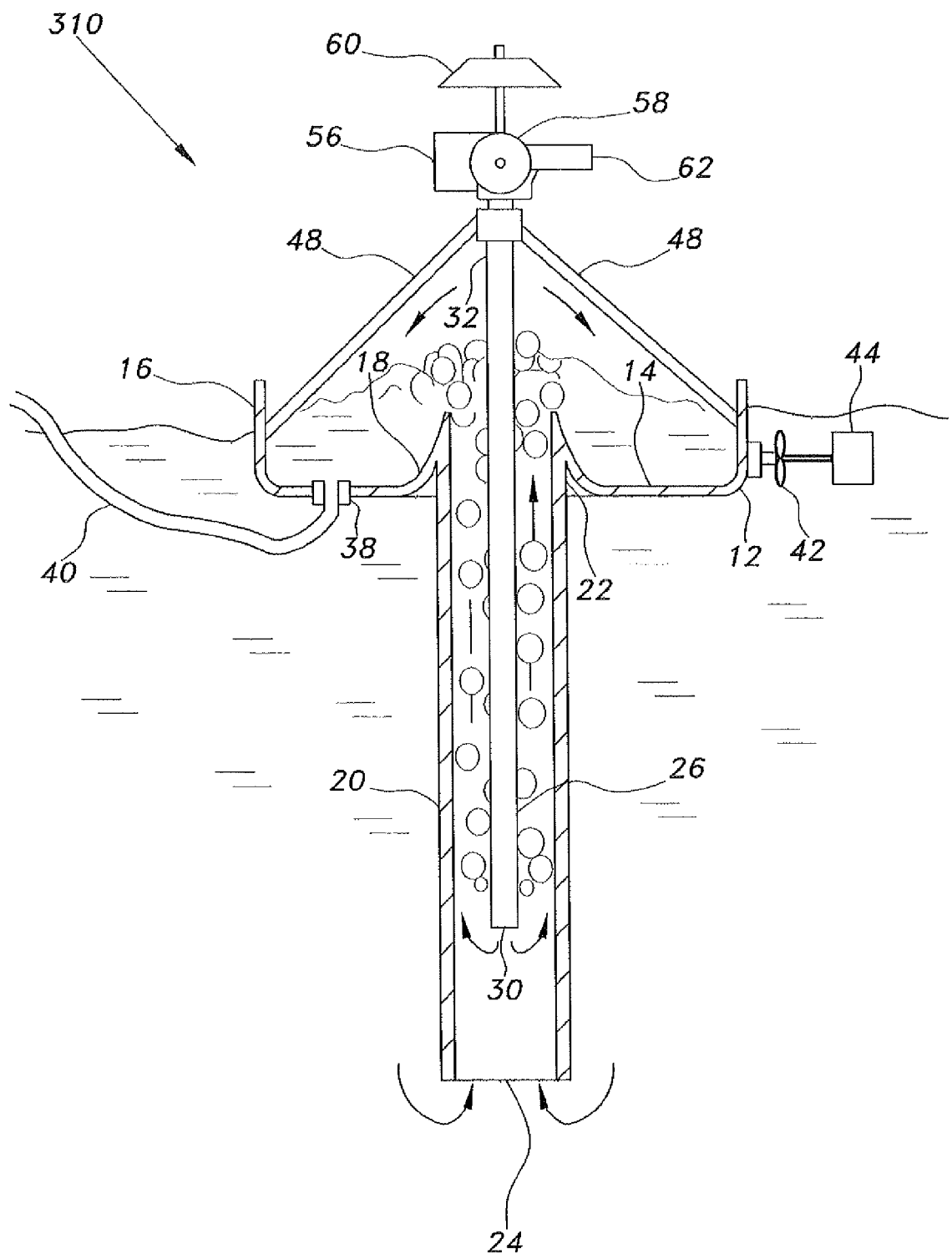
FIG. 8 is a side view of the mobile buoyant aerator of FIG. 7, shown partially in section to illustrate further features thereof.

FIGS. 7 and 8 illustrate yet another embodiment 310 of a mobile buoyant aerator that is similar to the embodiment 10 of FIGS. 1 and 2, but in which a pneumatic pump and motor replace the compressed gas or air tank positioned at the top of the fluid entrainment tube. Most of the components of the mobile buoyant aerator 310 of FIGS. 7 and 8 are identical to those corresponding components of the aerator 10 of FIGS. 1 and 2, i.e., the contaminant capture tray 12, its floor 14 and walls 16 and 18, the fluid entrainment tube 20 having upper and lower ends 22 and 24, the gas or air delivery tube 26 having lower and upper ends 30 and 32, the capture tray drain 38 (shown in FIG. 8) and drain hose or line 40, and the motorized propeller 42 and rudder 44. The skimmer and filter screen are not shown in the embodiment of FIGS. 7 and 8, although they may be added, if desired, as noted further above.

The mobile buoyant aerator 310 of FIGS. 7 and 8 differs from the embodiment of FIGS. 1 and 2 in that a pneumatic pump 56 and drive motor 58 replace the compressed air or gas tank or container at the upper end 32 of the gas or air delivery tube 26. The motor 58 may be powered by any suitable conventional means, e.g., the solar cells 60 illustrated in FIGS. 7 and 8. The upper end 32 of the gas or air delivery tube 26 is supported by appropriate struts or stays 48, similar to the configuration of the aerator 210 of FIGS. 5 and 6. Additional braces (not shown) may be used to affix the lower end 30 of the tube 26 within the outer entrainment tube 20.

Operation of the mobile buoyant aerator 310 is similar to that described further above for the aerator 10 of FIGS. 1 and 2, but with the air being supplied by the pneumatic pump 56, rather than by a tank or container of compressed air or gas. The pump 56 draws air in through an air inlet tube or line 62 and forces the air down through the gas delivery tube 26 to the lower portion of the fluid entrainment tube 20. The air or gas bubbling upward through the entrainment tube 20 entrains water therewith. The air and water mix (and any contaminants entrained therewith) bubbles out from the upper end 22 of the entrainment tube 20, to be captured in the tray 12. Suitable filtration or screening means may be incorporated into the aerator 310, if desired, substantially as shown and described further above for the aerator 10 of FIGS. 1 and 2.

Accordingly, the various embodiments of the mobile buoyant aerator provide for the decontamination of bodies of water by removing contaminants therefrom and/or aerating the water to allow aerobic bacteria to process organic material in the water. Either or both functions may be achieved simultaneously, depending upon the quality of the water being treated and/or the specific embodiment of the mobile buoyant aerator. The versatility of the aerator, which is capable of automatic and autonomous operation, greatly reduces the need for human oversight and supervision, thereby freeing personnel to carry out other chores and activities as the water decontamination and purification process is achieved.

It is to be understood that the present invention is not limited to the embodiments described above, but encompasses any and all embodiments within the scope of the following claims.

I claim:

1. A mobile buoyant aerator designed and configured for floating in, and for aerating at least an upper strata of a body of water, comprising:
 a toroidally configured buoyant capture tray having a floor, an outer wall, and an inner wall, the inner wall being concentric with the outer wall, and the capture tray having an open top;
 means for filtering disposed on the open top of the capture tray;

a propulsion and guidance system coupled to the outer wall of the capture tray, the propulsion and guidance system being designed and configured for selectively moving the floating aerator in the body of water, the propulsion and guidance system including means for self-propelling;

wherein the means for self-propelling selectively chosen from the group consisting of remote control actuation and preprogrammed autonomous actuation;

a fluid entrainment tube extending downward from the capture tray, the fluid entrainment tube having an open upper end, an open lower end, and a hollow interior;

the open upper end having an opening with the center of the opening located on the central axis of the fluid entrainment tube;

wherein the upper end of the fluid entrainment tube being surrounded by the inner wall;

a fluid delivery device communicating with the interior of the fluid entrainment tube; and a drain passage extending through the floor of the capture tray.

2. The mobile buoyant aerator according to claim 1, further comprising a contaminant skimmer disposed in the upper end of the fluid entrainment tube.

3. The mobile buoyant aerator according to claim 1 wherein the fluid delivery device consists of:
a gas delivery tube disposed concentrically through the fluid entrainment tube, the gas delivery tube having an upper end disposed above the capture tray and a lower end disposed within the lower end of the fluid entrainment tube; and
a tank of compressed gas disposed upon the upper end of the gas delivery tube, the tank of compressed gas selectively delivering gas to the fluid entrainment tube through the gas delivery tube.

4. The mobile buoyant aerator according to claim 1 wherein the fluid delivery device consists of a tank of compressed gas disposed upon the lower end of the fluid entrainment tube, the tank of compressed gas selectively delivering gas to the fluid entrainment tube.

5. The mobile buoyant aerator according to claim 1, wherein the fluid delivery device consists of:
a water delivery tube disposed concentrically within the fluid entrainment tube, the water delivery tube having an upper end disposed above the capture tray and a lower end disposed within the lower end of the fluid entrainment tube; and
a water pump disposed upon the upper end of the water delivery tube, the water pump selectively delivering water to the fluid entrainment tube through the water delivery tube.

6. The mobile buoyant aerator according to claim 1, wherein the fluid delivery device consists of:
a gas delivery tube disposed concentrically within the fluid entrainment tube, the gas delivery tube having an upper end disposed above the capture tray and a lower end disposed within the lower end of the fluid entrainment tube; and
an air pump disposed upon the upper end of the gas delivery tube, the air pump selectively delivering air to the fluid entrainment tube through the gas delivery tube.

7. A mobile buoyant aerator floatable in a body of water, the mobile buoyant aerator aerating at least an upper strata of the body of water, comprising:
a buoyant capture tray having a toroidal configuration including a substantially circular floor having an outer perimeter and a substantially central opening therein defining an inner perimeter, an outer wall extending upwardly from the outer perimeter of the floor, and an inner wall extending upwardly from the inner perimeter of the floor;
a fluid entrainment tube extending downward from the tray, the fluid entrainment tube having an open upper end, an open lower end, and a hollow interior;
wherein the open upper end of the fluid entrainment tube being coupled to the inner wall of the buoyant capture tray;
whereby fluid flows through the open upper end, the hollow interior, and the open lower end;
wherein the open upper end has an opening with the center of the opening located on the central axis of the fluid entrainment tube;
a fluid delivery device communicating with the interior of the fluid entrainment tube;
a contaminant skimmer disposed in the upper end of the fluid entrainment tube; and
a propulsion and guidance system disposed upon the outer wall of the capture tray;
wherein the propulsion and guidance system includes at least a rudder and motorized propeller;
wherein the propulsion and guidance system includes operational controls selected from the group consisting of automatic and remote.

8. The mobile buoyant aerator according to claim 7, further comprising a drain passage extending through the floor of the capture tray.

9. The mobile buoyant aerator according to claim 7, wherein the inner wall being concentric with the outer wall and being concentric and surrounding the upper end of the fluid entrainment tube.

10. The mobile buoyant aerator according to claim 7, wherein the fluid delivery device consists of:
a gas delivery tube disposed concentrically through the fluid entrainment tube, the gas delivery tube having an upper end disposed above the capture tray and a lower end disposed within the lower end of the fluid entrainment tube; and
a tank of compressed gas disposed upon the upper end of the gas delivery tube, the tank of compressed gas selectively delivering gas to the fluid entrainment tube through the gas delivery tube.

11. The mobile buoyant aerator according to claim 7 wherein the fluid delivery device consists of a tank of compressed gas disposed upon the lower end of the fluid entrainment tube, the tank of compressed gas selectively delivering gas to the fluid entrainment tube.

12. The mobile buoyant aerator according to claim 7, wherein the fluid delivery device consists of:
a water delivery tube disposed concentrically within the fluid entrainment tube, the water delivery tube having an upper end disposed above the capture tray and a lower end disposed within the lower end of the fluid entrainment tube; and
a water pump disposed upon the upper end of the water delivery tube, the water pump selectively delivering water to the fluid entrainment tube through the water delivery tube.

13. The mobile buoyant aerator according to claim 7 wherein the fluid delivery device consists of:
a gas delivery tube disposed concentrically within the fluid entrainment tube, the gas delivery tube having an upper end disposed above the capture tray and a lower end disposed within the lower end of the fluid entrainment tube; and an air pump disposed upon the upper end of the gas delivery tube, the air pump selectively delivering air to the fluid entrainment tube through the gas delivery tube.

14. A mobile buoyant aerator, floatable in a body of water, the mobile buoyant aerator being designed and configured for aerating the body of water adjacent thereto, comprising:
- a buoyant, toroidal capture tray having a floor, an outer wall, and an inner wall concentric with the outer wall;
- a fluid entrainment tube extending downward from the center of the capture tray, the fluid entrainment tube defined by a tubular wall having an open upper end, an open lower end, and a hollow interior, the inner wall of the capture tray surrounding the open upper end of the fluid entrainment tube;
- wherein the open upper end has an opening with the center of the opening located on the central axis of the fluid entrainment tube;
- a filter disposed in the capture tray, above floor, and between the outer wall and the inner wall;
- a contaminant skimmer disposed in the upper end of the fluid entrainment tube; and
- a fluid delivery device communicating with the interior of the fluid entrainment tube.

15. The mobile buoyant aerator according to claim 14, further comprising:
- a drain passage extending through the floor of the capture tray; and
- a propulsion and guidance system disposed upon the outer wall of the capture tray.

16. The mobile buoyant aerator according to claim 14, wherein the fluid delivery device consists of:
- a gas delivery tube disposed concentrically through the fluid entrainment tube, the gas delivery tube having an upper end disposed above the capture tray and a lower end disposed within the lower end of the fluid entrainment tube; and
- a tank of compressed gas disposed upon the upper end of the gas delivery tube, the tank of compressed gas selectively delivering gas to the fluid entrainment tube through the gas delivery tube.

17. The mobile buoyant aerator according to claim 14 wherein the fluid delivery device consists of a tank of compressed gas disposed upon the lower end of the fluid entrainment tube, the tank of compressed gas selectively delivering gas to the fluid entrainment tube.

18. The mobile buoyant aerator according to claim 14, wherein the fluid delivery device consists of:
- a water delivery tube disposed concentrically within the fluid entrainment tube, the water delivery tube having an upper end disposed above the capture tray and a lower end disposed within the lower end of the fluid entrainment tube; and
- a water pump disposed upon the upper end of the water delivery tube, the water pump selectively delivering water to the fluid entrainment tube through the water delivery tube.

19. The mobile buoyant aerator according to claim 14, wherein the fluid delivery device consists of:
- a gas delivery tube disposed concentrically within the fluid entrainment tube, the gas delivery tube having an upper end disposed above the capture tray and a lower end disposed within the lower end of the fluid entrainment tube; and
- an air pump disposed upon the upper end of the gas delivery tube, the air pump selectively delivering air to the fluid entrainment tube through the gas delivery tube.

20. The mobile buoyant aerator according to claim 14, further comprising:
- a drain passage extending through the floor of the capture tray for fluid drainage from the capture tray;
- a line coupled to the drain passage for displacing the fluid drainage from the capture tray to a predetermined location; and
- a propulsion and guidance system disposed upon the outer wall of the capture tray;
- the propulsion and guidance system including a rudder and motorized propeller;
- wherein the propulsion and guidance system being selectively and operatively controlled according to the group consisting of remote actuation, and predetermined programming.

* * * * *